United States Patent
Maciejewski et al.

(10) Patent No.: US 7,388,952 B2
(45) Date of Patent: *Jun. 17, 2008

(54) METHOD AND SYSTEM FOR PROVIDING ENHANCED CALL WAITING

(75) Inventors: James Thomas Maciejewski, Spring Grove, IL (US); Claude Lee Harrington, Indianapolis, IN (US); Nancy Ann Book, Naperville, IL (US); Mary Louise Hardzinski, Palatine, IL (US); Robert Wesley Bossemeyer, Jr., St. Charles, IL (US); Susanne Marie Crockett, Buffalo Grove, IL (US); Thomas Joseph McBlain, Arlington Heights, IL (US)

(73) Assignee: AT&T Knowledge Ventures, LP, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/545,401

(22) Filed: Oct. 10, 2006

(65) Prior Publication Data

US 2007/0121807 A1    May 31, 2007

Related U.S. Application Data

(63) Continuation of application No. 10/978,207, filed on Oct. 29, 2004, now Pat. No. 7,139,383, which is a continuation of application No. 10/409,860, filed on Apr. 8, 2003, now Pat. No. 6,829,343, which is a continuation of application No. 09/716,169, filed on Nov. 17, 2000, now abandoned, which is a continuation of application No. 09/044,574, filed on Mar. 19, 1998, now Pat. No. 6,219,414.

(51) Int. Cl.
H04M 3/42 (2006.01)
H04M 1/00 (2006.01)
H04M 1/64 (2006.01)

(52) U.S. Cl. .............................. 379/215.01; 379/88.21; 379/374.02

(58) Field of Classification Search .............. 379/88.2, 379/88.21, 142.01, 142.08, 142.14, 207.02, 379/207.04, 208.01, 209.01, 211.02, 212.01, 379/213.01, 215.01, 373.01, 373.04, 374.01, 379/374.02
See application file for complete search history.

(56) References Cited

U.S. PATENT DOCUMENTS

| | | | |
|---|---|---|---|
| 4,899,358 A | 2/1990 | Blakley | |
| 5,007,076 A | 4/1991 | Blakley | |
| 5,265,145 A | 11/1993 | Lim | |
| 5,289,530 A | 2/1994 | Reese | |
| 5,309,512 A | 5/1994 | Blackmon et al. | |

(Continued)

OTHER PUBLICATIONS

One-Page document entitled "Call Waiting With Audible Name.", Dec. 2004.

*Primary Examiner*—Harry S. Hong
(74) *Attorney, Agent, or Firm*—Brinks Hofer Gilson & Lione

(57) ABSTRACT

A system and method for providing information about a calling party to a called party is disclosed. Generally, a network element obtains information about a calling party when a telephone line of a called party is busy. The network element notifies the called party that the calling party is attempting to contact the called party and transmits an audible version of the information about the calling party to the called party without receiving an input from the called party.

21 Claims, 7 Drawing Sheets

U.S. PATENT DOCUMENTS

| | | |
|---|---|---|
| 5,349,638 A | 9/1994 | Pitroda et al. |
| 5,388,150 A | 2/1995 | Schneyer et al. |
| 5,452,346 A | 9/1995 | Miyamoto |
| 5,481,594 A | 1/1996 | Shen et al. |
| 5,483,588 A | 1/1996 | Easton et al. |
| 5,511,111 A | 4/1996 | Serbetcioglu et al. |
| 5,526,406 A | 6/1996 | Luneau |
| 5,533,106 A | 7/1996 | Blumhardt |
| 5,594,784 A | 1/1997 | Velius |
| 5,602,908 A | 2/1997 | Fan |
| 5,604,790 A | 2/1997 | Grimes |
| 5,613,006 A | 3/1997 | Reese |
| 5,625,676 A | 4/1997 | Greco et al. |
| 5,636,269 A | 6/1997 | Eisdorfer |
| 5,646,979 A | 7/1997 | Knuth |
| 5,651,053 A | 7/1997 | Mitchell |
| 5,652,789 A | 7/1997 | Miner et al. |
| 5,668,863 A | 9/1997 | Bieselin et al. |
| 5,680,447 A | 10/1997 | Diamond et al. |
| 5,692,038 A | 11/1997 | Kraus et al. |
| 5,729,592 A | 3/1998 | Frech et al. |
| 5,848,142 A | 12/1998 | Yaker |
| 5,850,435 A | 12/1998 | Devillier |
| 5,894,504 A | 4/1999 | Alfred et al. |
| 5,946,386 A | 8/1999 | Rogers et al. |
| 5,999,611 A | 12/1999 | Tatchell et al. |
| 6,219,414 B1 | 4/2001 | Maciejewski et al. |
| 6,233,325 B1 * | 5/2001 | Frech et al. ............ 379/142.06 |
| 6,633,634 B1 | 10/2003 | Crockett et al. |
| 6,829,343 B2 | 12/2004 | Maciejewski et al. |
| 7,139,383 B2 | 11/2006 | Maciejewski et al. |

* cited by examiner

METHOD AND SYSTEM FOR PROVIDING ENHANCED CALL WAITING

RELATED APPLICATIONS

The present application is a continuation of U.S. patent application Ser. No. 10/978,207 (now U.S. Pat. No. 7,139,383), filed Oct. 29, 2004, which is a continuation of U.S. patent application Ser. No. 10/409,860 (now U.S. Pat. No. 6,829,343), filed Apr. 8, 2003, which is a continuation of U.S. patent application Ser. No. 09/716,169 (now abandoned), filed Nov. 17, 2000, which is a continuation of U.S. patent application Ser. No. 09/044,574 (now U.S. Pat. No. 6,219,414), filed Mar. 19, 1998, the entirety of each of which are hereby incorporated by reference.

BACKGROUND

The present invention relates generally to telecommunications call processing and more particularly to call waiting service features.

Call waiting services are offered by numerous service providers and are well known by those skilled in the art. Call waiting services generally notify a customer that is busy on a previous call that a current call has been placed to the customer. Call waiting services commonly utilize an audible tone that is transmitted to the customer, to notify the customer that the current call is waiting. When the customer is notified that the current call is waiting, the customer can decide whether or not to suspend the previous call to take the current call. Accordingly, information about the current call aids in the customer's decision. U.S. Pat. No. 4,899,358 describes a system that provides an audible representation of the calling party's name to notify a customer that a call is waiting. This system substitutes the name in place of the tone commonly used to notify the customer. While substitution of the name in place of the tone provides the customer with additional information, delivering information in this format can result in confusion for the customer. For example, providing just the name of a caller can be confusing when the name is interjected in the middle of a conversation without warning.

Other systems provide additional information to the customer in varying formats. U.S. Pat. No. 5,309,512 describes a system that first provides a tone to indicate that a current call is waiting and then waits for a command from the customer. This system only provides the name of the calling party after receiving the command. To provide the required command, the customer completes a flash hook at his telephone station. The flash hook puts the previous caller on hold for a significant amount of time while the customer hears the name of the current caller and then decides whether or not to take the current call. Providing information in this format also creates additional problems for the customer. For example, the customer is not immediately provided with the information necessary to decide whether or not to take the current call. This results in an inconvenience for the both the previous caller and the customer, especially if the customer ultimately decides not to take the current call and returns to the previous call after a significant delay in the call.

DETAILED DESCRIPTION OF THE DRAWINGS

Figure 1:
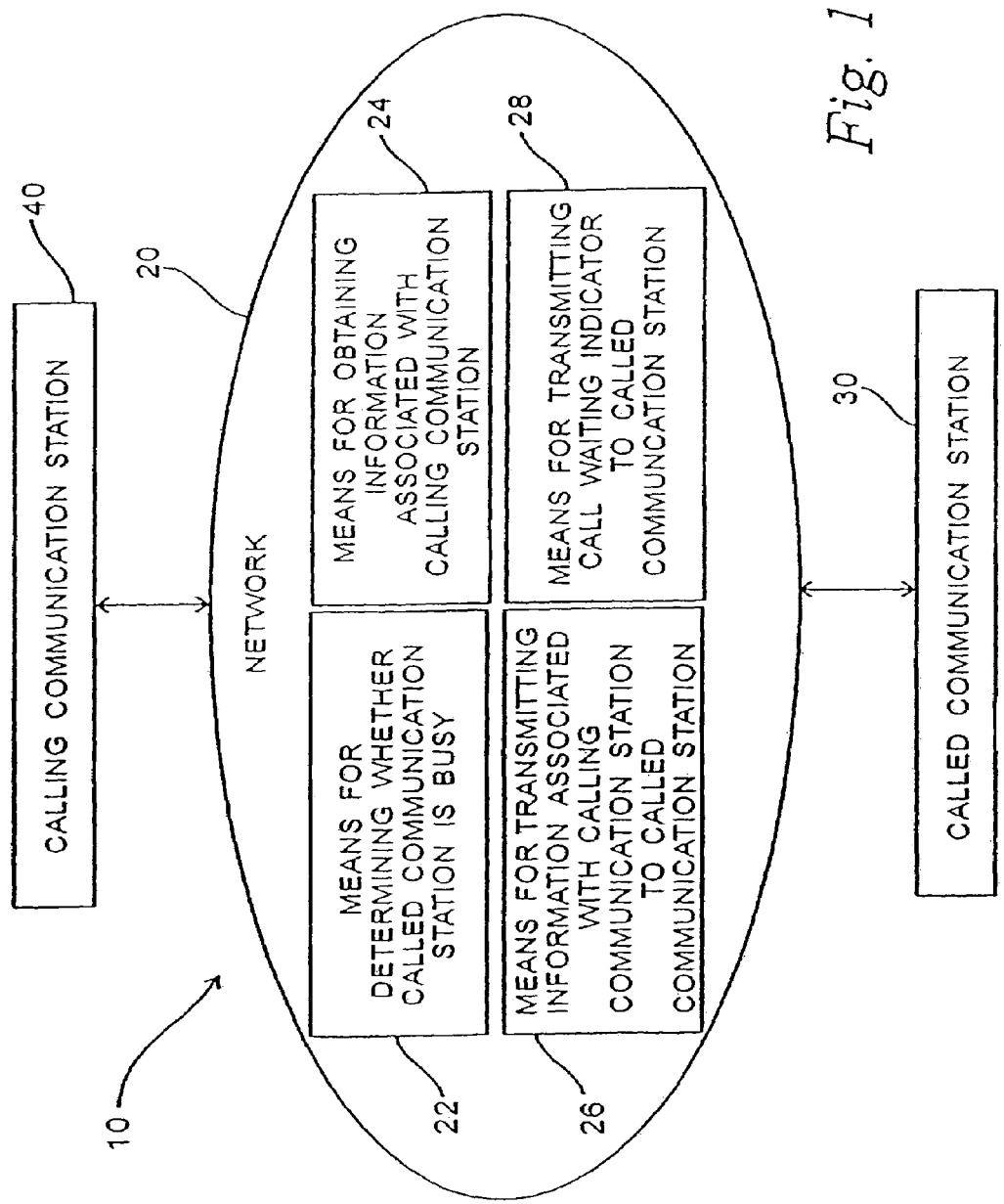
FIG. 1 is a block diagram of a system for processing a telephone call of a preferred embodiment.

By way of example, FIG. 1 depicts a system 10 of a preferred embodiment. The system 10 comprises a network 20, a called communication station 30 connected with the network 20 and a calling communication station 40 connected with the network 20. The network 20 preferably comprises: means for determining whether the called communication station is busy 22, means for obtaining information associated with the calling communication station 24; means for transmitting the information associated with the calling communication station to the called communication station 26; and means for transmitting a call waiting indicator to the called communication station 28.

The system 10 is preferably implemented in a telecommunications network as known by those skilled in the art. Alternatively, the system 10 can be implemented in computer network or any other network that is adapted to store and retrieve information. Each of the means 22, 24, 26, 28 described above is preferably implemented through the use of computer readable program code written in any suitable programming language and implemented on an analog or digital computer utilizing any suitable operating system as known by those skilled in the art. Alternatively, each of the means 22, 24, 26, 28 can be implemented through the use of hardware in the form of a hardwired computer, an integrated circuit, or a combination of hardware and computer readable program code as known by those skilled in the art. The calling communication station 40 and the called communication station 30 preferably comprise an analog telephone station as known by those skilled in the art. According to an alternative embodiment, the communication stations 30, 40 can comprise any suitable communication station adapted for use in the present embodiments as known by those skilled in the art.

The system 10 enables a customer at the called communication station 30, who is busy on a previous call, to be efficiently and effectively notified that a current call from calling communication station 40 is waiting. The system 10 provides an enhanced call waiting message that includes both the call waiting indicator and the audible representation of information associated with the calling communication station 40. The call waiting indicator and the audible representation of information associated with the calling communication station can be automatically transmitted to the called communication station 30 prior to any commands from the customer. The combination of the call waiting indicator and the information associated with the calling communication station alerts the customer that the current call is waiting and provides the customer with information that assists the customer in deciding whether to take the current call.

Figure 2:
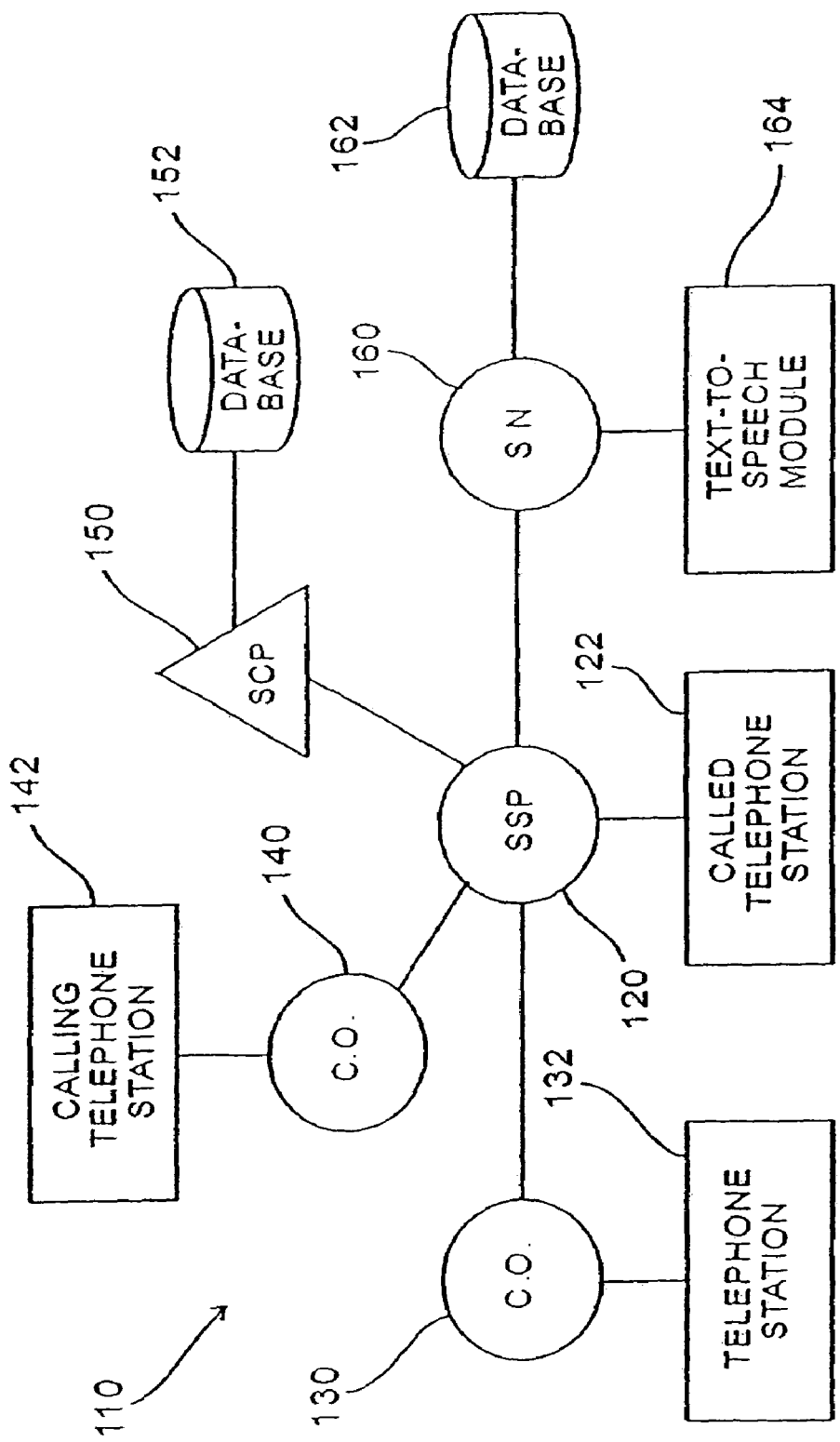
FIG. 2 is more detailed block diagram of the system depicted in FIG. 1.

By way of further example, FIG. 2 depicts a preferred embodiment of the system described above. The system 110 comprises a service switching point (SSP) 120, a service control point (SCP) 150, an SCP database 152, a service node (SN) 160, a database 162, central offices 130, 140 and telephone stations 122, 132, 142. Intelligent network system components, commonly referred to as advanced intelligent network (AIN) components, suitable for implementing the present embodiment are commercially available from Lucent Technologies and are well know by those skilled in the art. AIN components can implement computer readable program code as known by those skilled in the art. Vendors of AIN components typically have a preferred programming language and operating platform as known by those skilled in the art.

SSP 120 preferably comprises an AIN switch that routes calls, generates queries to SCP 150 to obtain call control information and responds to call control information. SSP 120 connects called telephone station 122 with central offices 130,140 to enable a customer at called telephone station 122 to place calls to and receive calls from telephone stations 132,142. SSP 120 preferably communicates with SCP 150, central offices 130,140, and SN 160 in accordance with a signaling protocol such as Signaling System 7 (SS7) or other such signaling protocols as known by those skilled in the art.

SCP 150 preferably comprises an AIN element that stores call control information in SCP database 152 and accesses the stored call control information. SCP 150 receives queries generated by SSP 120 and preferably responds to the queries by performing database searches to locate the requested call control information. SCP 150 can forward the located call control information to SSP 120. SCP 150 preferably comprises an AIN element as well known by those skilled in the art.

SN 160 preferably comprises a network element that stores call control information and performs call related functions as known by those skilled in the art. SN 160 receives calls forwarded from SSP 120, performs searches or other requested functions and returns information or data to SSP 120. In an alternate embodiment, SN 160 can be configured to produce call waiting indicators as described herein. SN 160 preferably includes a text to speech module 164 that performs text to speech conversions to produce an audible representation of the text. Such modules and conversions are well known by those skilled in the art.

Database 152 preferably comprises a data storage element for use with SCP 150 as well known by those skilled in the art. Database 152 preferably stores call control information that can be implemented by SSP 120 to control calls. Such call control information is well known by those skilled in the art.

Database 162 preferably comprises a caller identification with name database as known by those skilled in the art. Database 162 preferably stores information associated with a telephone number that is associated with calling telephone station 142. The information associated with the telephone number preferably comprises the identity of a caller in the form of the caller's name. Alternatively, the information associated with the telephone number can comprise the identity of a caller in the form of the caller's name and the telephone number for calling telephone station 142. The telephone number preferably comprises a 10 digit telephone number as known by those skilled in the art but can also comprise any type of identification format used to identify telephone stations. Database 162 can alternatively comprise a caller assistance database as known by those skilled in the art. While database 162 is depicted within a telecommunications system, database 162 can comprise any suitable database containing information adapted for use in the present embodiment and is not limited to databases located within a telecommunications network.

Central offices 140, 150 preferably comprise AIN network switches as well known by those skilled in the art. Central offices 140, 150 comprise network switches that connect telephone stations 132, 142 with SSP 120 to enable callers at telephone stations 132, 142 to place calls to and receive calls from the customer at called telephone station 122. Alternatively, central offices 140, 150 can comprise non-AIN network switches as known by those skilled in the art.

Telephone stations 122,132,142 preferably comprise analog telephone sets as known by those skilled in the art. Alternatively, telephone stations 122,132,142 can comprise wireless, PCN, ISDN or any other form of communication station known by those skilled in the art.

Figure 3:
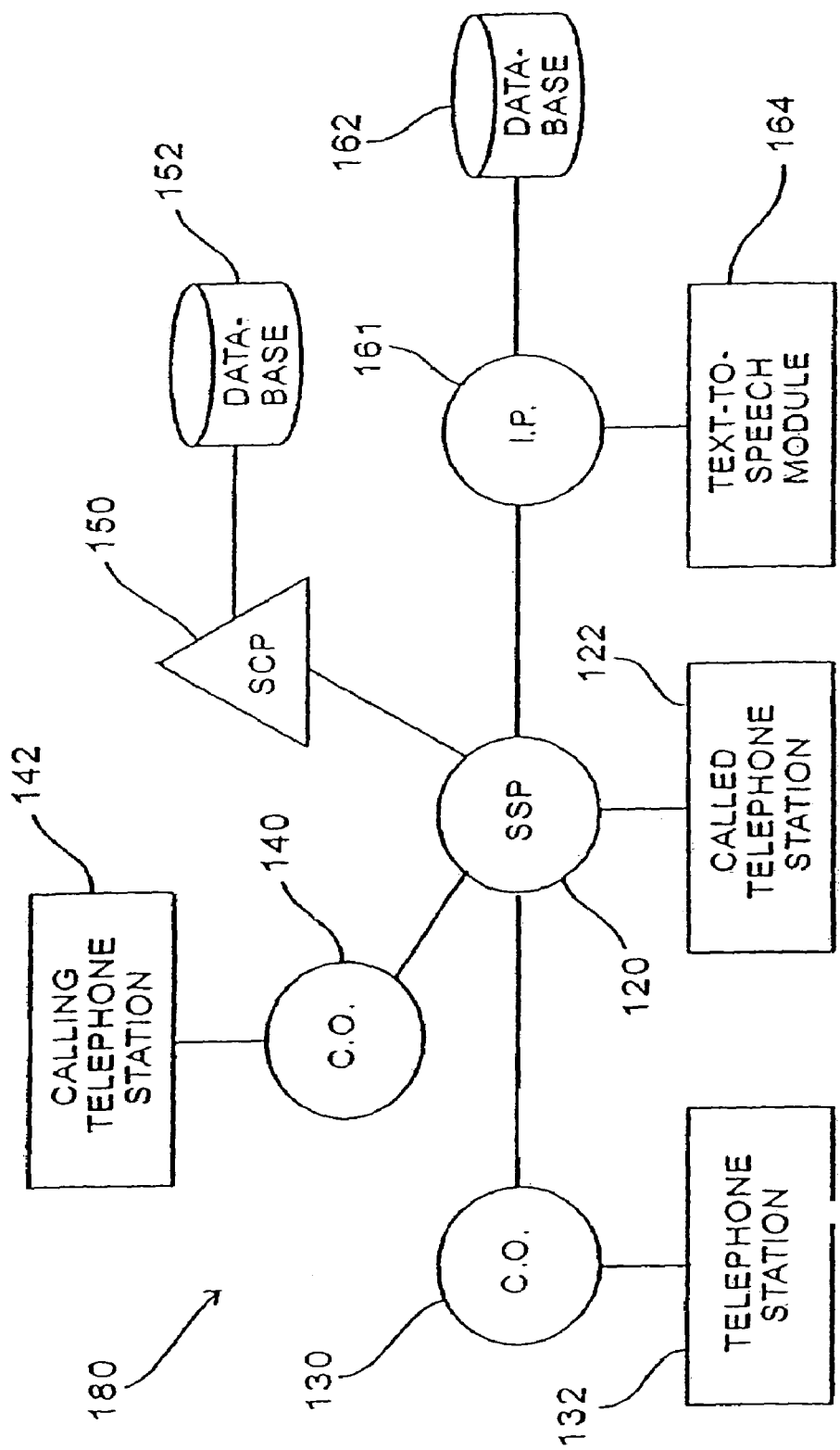
FIG. 3 is an alternate embodiment of the system depicted in FIG. 2.

Referring now to FIG. 3, an alternate embodiment of the system of FIG. 2 is shown. The system 180 comprises: an SSP 120; a called telephone station 122; central offices 130, 140; a telephone station 132; a calling telephone station 142; an SCP 150; an SCP database 152; a database 162; and a text-to-speech module 164 all as described above in reference to FIG. 2. The system also includes an intelligent peripheral (IP) 161 that communicates with SSP 120, database 162 and test-to-speech module 164 and performs the same functions as the SN 160 as described herein. The IP 161 preferably comprises an AIN element that acts on instructions from SCP 120. In an alternate embodiment, IP 161 can be configured to generate call waiting indicators as described herein.

Figure 4:
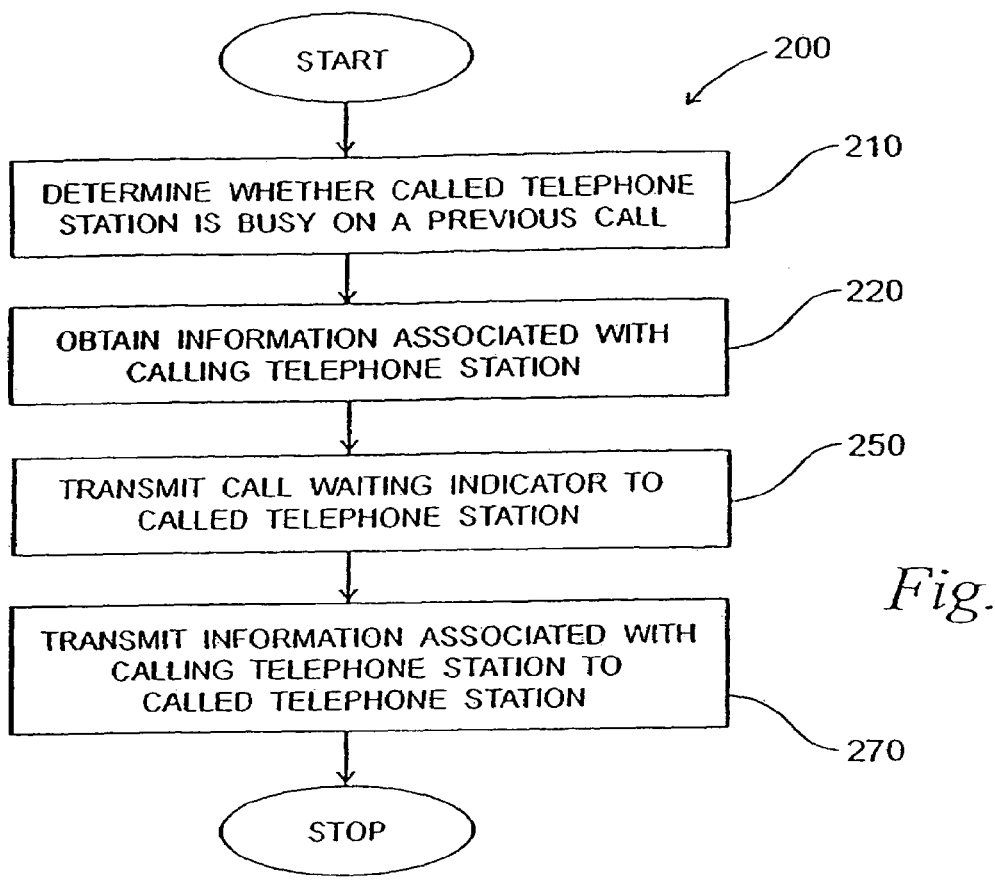
FIG. 4 is a flow chart of a method for processing a telephone call of a preferred embodiment.

The systems depicted in FIGS. 1, 2 and 3 can be utilized to implement the method 200 depicted in FIG. 4. For purposes of illustration, assume that a customer at called telephone station 122 (FIGS. 2, 3) is on a previous call with a previous calling party at telephone station 132. Connections are established between: telephone station 132 and central office 130; central office 130 and SSP 120; and SSP 120 and called telephone station 122; to enable the previous call to be connected. Also, assume that after the previous call has been commenced, a current calling party at calling telephone station 142 places a current call to the customer at called telephone station 122. In an attempt to connect the current call, central office 140 routes the current call to SSP 120.

The method 200 of processing a current call from a calling telephone station 142 (FIGS. 2, 3) to a called telephone station 122 generally includes the steps of: determining whether the called telephone station is busy on a previous call (step 210, FIG. 4); obtaining information associated with the calling telephone station (step 220); transmitting a call waiting indicator to the called telephone station 122 to signify that the current call is waiting (step 250); and automatically transmitting the information associated with the calling telephone station (step 270) to the called telephone station 122. Each of these steps is discussed in more detail below.

Figure 5:
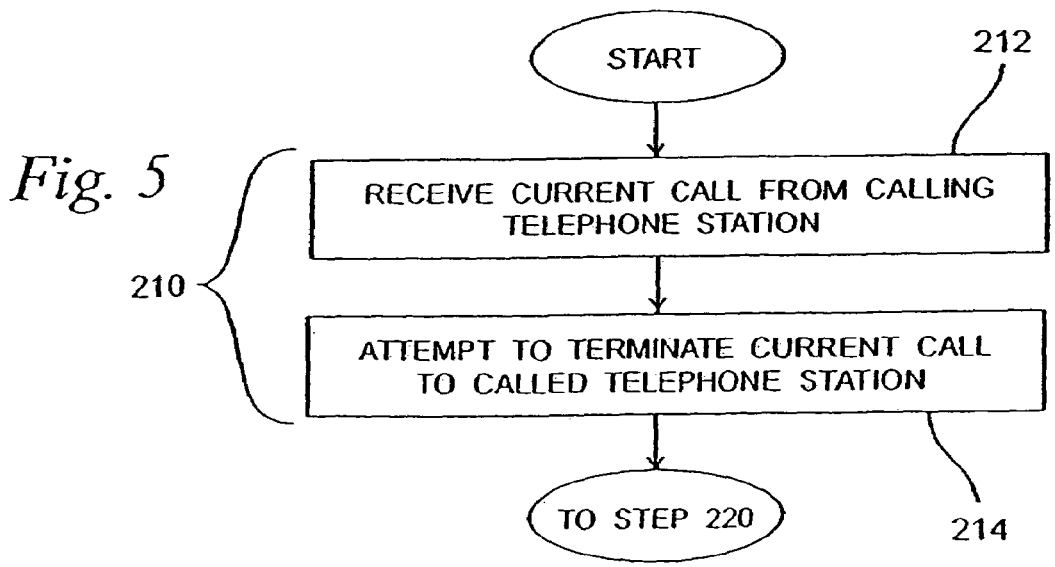
FIG. 5 is a more detailed flow chart of the method depicted in FIG. 4.

The step of determining whether the called telephone station is busy on a previous call (step 210, FIG. 4), preferably comprises the following steps as depicted in FIG. 5. SSP 120 receives the current call (step 212, FIG. 5) and attempts to terminate the call to called telephone station 122 (step 214). Because the customer at called telephone station 122 is busy on a previous call, the current call cannot be terminated to called telephone station 122 and SSP 120 determines that the customer at called telephone station 122 is busy on a previous call.

Figure 6:
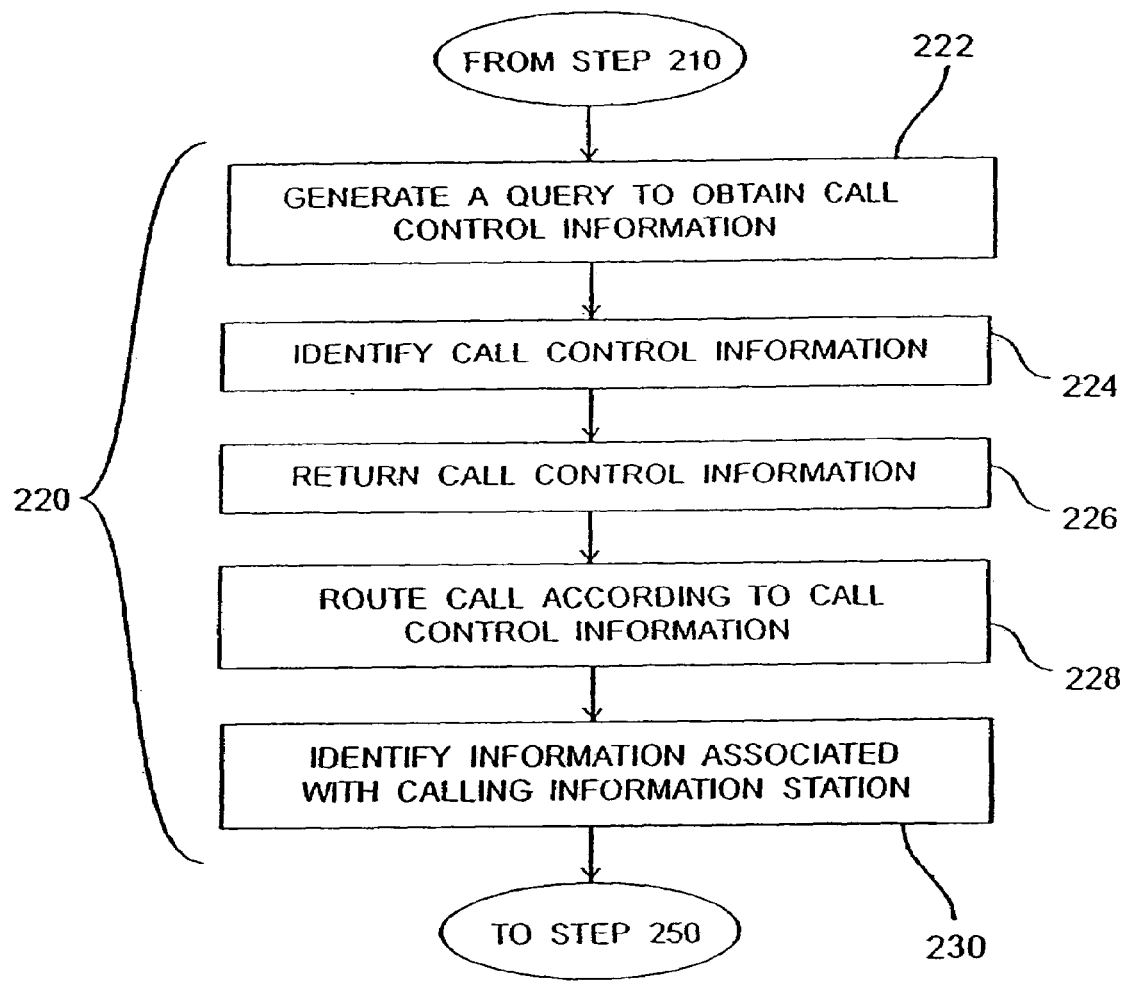
FIG. 6 is a more detailed flow chart of the method depicted in FIG. 4.

The step of obtaining information associated with the calling telephone station (step 220, FIG. 4) preferably comprises the following steps as depicted in FIG. 6. When SSP 120 determines that the customer at called telephone station 122 is busy on a previous call, SSP 120 generates a query to SCP 150 (step 222, FIG. 6) in accordance with a call forward on busy feature, or other similar function, to obtain call control information from SCP 150. Call forward on busy features and other similar functions are well known by those skilled in the art. The call control information instructs SSP 120 where to route the current call when called telephone station 122 is busy. After receiving the query from SSP 120, SCP 150 identifies the relevant call control information (step 224) and forwards it to SSP 120 (step 226). The relevant call control information has been created to enable SSP 120 to forward the current call to SN 160 or IP 161 when called telephone station 122 is busy. In accordance with the call control information, SSP 120 routes the current call to SN 160 or IP 161 (step 228). SN 160 or IP 161 examines the telephone number associated with calling telephone station 142 and identifies information corresponding to the telephone number by performing a database search (step 230). The information corresponding to the telephone number preferably comprises the identity of the current caller at calling telephone station 142 in the form of the name of the current caller. Database 162 preferably comprises a caller identification with name database as known by those skilled in the art. Alternatively, the database 162 can comprise a caller assistance database as known by those skilled in the art.

Figure 7:
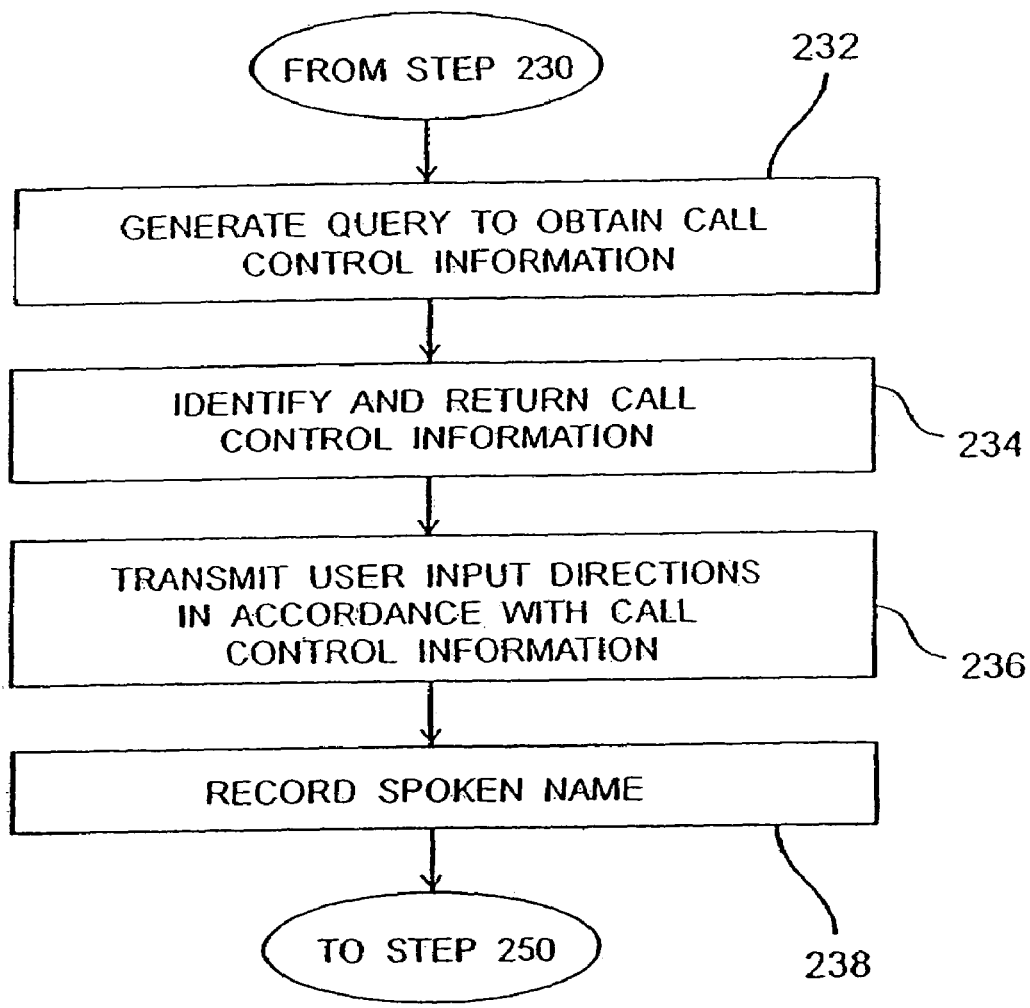
FIG. 7 is a more detailed flow chart of the method depicted in FIG. 4.

In accordance with an alternative embodiment, the step of obtaining information associated with the calling telephone station 142 (step 220, FIG. 4) further comprises the following steps as depicted in FIG. 7. If SN 160 or IP 161 cannot identify and return information associated with the telephone number, SSP 120 generates a query to SCP 150 (step 232, FIG. 7) requesting further call control information. SCP 150 locates and returns call control information to SSP 120 (step 234) that enables the creation of audible caller input directions that direct the calling party at calling telephone station 142 speak his or her name. SSP 120 transmits the caller input directions to calling telephone station 142 (step 236). When the calling party speaks their name, the spoken name is digitized and recorded by SN 160 or IP 161 (step 238). The recorded name can be played back to the customer at called telephone station 122 through the use of the speech processing capabilities of SN 160 or IP 161. SN 160 or IP 161 preferably provides the recorded name to the called telephone station 122 between the call waiting indicators as described herein.

According to an alternative of the above embodiment, when the caller at calling telephone station 142 speaks his or her name, the spoken name can be directly provided to the customer at called telephone station 122 through central office 140 and SSP 120. The name is preferably provided between the call waiting indicators as described herein.

In accordance with a further alternative embodiment, the step of obtaining information associated with the calling telephone station (step 220, FIG. 4) further comprises the following steps. When the user input directions, as described above, are transmitted to calling telephone station 142 (step 236, FIG. 7), additional user input instructions can be transmitted to calling telephone station 142. The additional user input instructions can request the calling party to provide additional information relating to the handling of and/or the content of the information associated with the calling telephone station 142. These directions preferably include requests for information from the calling party regarding the priority of the message to be delivered to called telephone station 122. For example, if the caller believes that the message is urgent, the caller may enter appropriate instructions that enable the SN 160 or IP 161 to generate standard or customized messages that are included in the information associated with calling telephone station 142 that is transmitted to called telephone station 122 (step 270, FIG. 4). The user can, for example, utilize a dual-tone-multi-frequency (DTMF) signal to provide information as known by those skilled in the art. This alternative can be implemented in conjunction with the methods depicted in FIGS. 6 and 7 and described herein.

In accordance with a further alternative embodiment, the step of obtaining information associated with calling telephone station 142 (step 206, FIG. 4) further comprises the following steps. When SSP 120 determines that called telephone station 122 is busy and generates a query to SCP 150 requesting call control information, SCP 150 identifies and returns call control information to SSP 120. The call control information directs SSP 120 to generate instructions that ask the calling party at calling telephone station 142 to speak his or her name. The instructions are sent to a caller at calling telephone station 142 without attempting to locate a name associated with the telephone number in a database. The spoken name can be recorded or delivered as described above.

Figure 8:
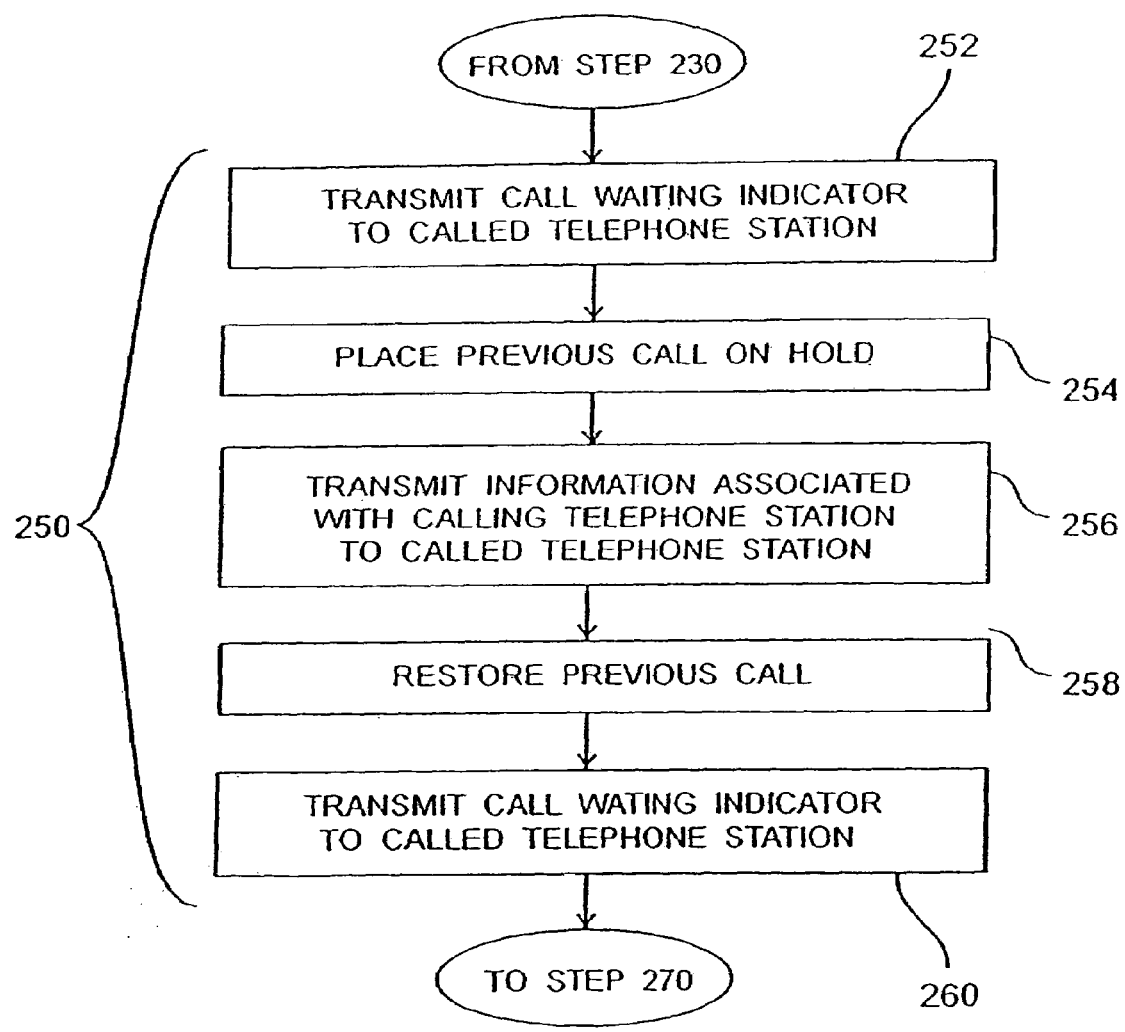
FIG. 8 is a more detailed flow chart of the method depicted in FIG. 4.

According to a preferred embodiment as depicted in FIG. 8, SSP 120 preferably generates the call waiting indicator comprising a tone or other similar indicator that is transmitted to called telephone station 122 to signify the start of the call waiting message (step 252, FIG. 8). The call path of the previous call is temporarily interrupted to temporarily place the previous call on hold (step 254) while the SN 160 or IP 161 automatically transmits an audible representation of the name associated with a caller at calling telephone station 142 to called telephone station 122 (step 256). SN 160 or IP 161 implements the text to speech module 164 to generate an audible representation of the name associated with calling telephone station 142. The audible representation of the name is preferably transmitted to called telephone station 122 within a predetermined amount of time after the call waiting indicator is transmitted. The previous call is restored after the name has been transmitted to called telephone station 122 (step 258). SSP 120 preferably generates a second call waiting indicator comprising a tone or other similar indicator that is sent to called telephone station 122 (step 260). The second call waiting indicator is preferably transmitted to called telephone station 122 within a predetermined amount of time after the name is transmitted. According to an alternative embodiment, the steps of transmitting a call waiting indicator (step 250, FIG. 4, steps 252, 260, FIG. 8) comprise transmitting a plurality of tones to called telephone station 122. According to a further alternative embodiment, the call waiting indicators are generated by SN 160 or IP 161 and transmitted to called telephone station 122.

According to an alternate embodiment, the information associated with calling telephone station 142, described in conjunction with FIGS. 4, 5, 6, 7 and 8 comprises the identity of a caller at calling telephone station 142 and the telephone number associated with calling telephone station 142.

The present embodiments provide an efficient and effect method and system for providing an audible call waiting notification to a customer who is busy on a previous call. The present embodiments notify the customer that a current call is waiting in an effective manner that reduces confusion. Confusion is reduced by the combination of audible call waiting indicators and an audible representation of information associated with the calling telephone station. Additionally, both the indicator and the representation of the information can be provided automatically without significant delay and without any input from the caller.

It is to be understood that a wide range of changes and modifications to the embodiments described above will be apparent to those skilled in the art and are contemplated. It is therefore intended that the foregoing detailed description be regarded as illustrative rather than limiting, and that it be understood that it is the following claims, including all equivalents, that are intended to define the spirit and scope of the invention.

The invention claimed is:

1. A method for providing information about a calling party to a called party, the method comprising:
   obtaining information about the calling party when the called party's communication device is unavailable;
   notifying the called party that the calling party is attempting to contact the called party; and
   transmitting an audible version of the information about the calling party to the called party without receiving an input from the called party.

2. The method of claim 1, wherein obtaining information about the calling party when the called party's communication device is unavailable comprises obtaining an identity of the calling party.

3. The method of claim 1, wherein obtaining information about the calling party when the called party's communication device is unavailable comprises obtaining an identity of the calling party and a telephone number of the calling party.

4. The method of claim 1, wherein notifying the called party that the calling party is attempting to contact the called party comprises transmitting an audible call waiting indicator to the called party.

5. The method of claim 1, wherein notifying the called party that the calling party is attempting to contact the called party comprises transmitting a single call waiting tone to the called party.

6. The method of claim 1, wherein notifying the called party that the calling party is attempting to contact the called party comprises transmitting a plurality of call waiting tones to the called party.

7. The method of claim 1, wherein notifying the called party that the calling party is attempting to contact the called party comprises transmitting at least one call waiting tone preceding the information about the calling party and transmitting at least one call waiting tone following the information about the calling party.

8. The method of claim 1, wherein transmitting an audible version of the information about the calling party to the called party without receiving an input from the called party comprises transmitting an audible version of an identity of the calling party to the called party.

9. The method of claim 1, wherein transmitting an audible version of the information about the calling party to the called party without receiving an input from the called party comprises transmitting an audible version of an identity of the calling party and a telephone number of the calling party to the called party.

10. The method of claim 1, further comprising determining whether the called party's communication device is unavailable prior to obtaining information about the calling party when the called party's telephone line is busy.

11. The method of claim 1, further comprising:
    connecting the called party and the calling party after the called party has indicated that they would like to be connected to the calling party.

12. A computer-readable storage medium comprising a set of instructions for providing information about a calling party to a called party, the set of instructions to direct a processor to perform acts of:
    obtaining information about the calling party when the called party's communication device is unavailable;
    notifying the called party that the calling party is attempting to contact the called party; and
    transmitting an audible version of the information about the calling party to the called party without receiving an input from the called party.

13. A network element for providing information about a calling party to a called party, the network element in communication with at least a second network element, the network element comprising:
    a text-to-speech module operative to perform text to speech conversions to create audible representations of text;
    wherein the network element is operative to obtain information about the calling party from the at least the second network element when a called party's communication device is unavailable, to convert the obtained information into an audible representation using the text-to-speech module, and to transmit the audible version of the information about the calling party to the called party without receiving an input from the called party.

14. The network element of claim 13, wherein the network element is further operative to transmit at least one call waiting tone to the called party before transmitting the audible version of the information about the calling party to the called party.

15. The network element of claim 13, wherein the obtained information about the calling party comprises a telephone number.

16. The network element of claim 13, wherein the obtained information about the calling party comprises a name.

17. The network element of claim 13, wherein the network element is further operative to determine whether the called party's communication device is unavailable.

18. The network element of claim 13, wherein the network element obtains the information about the calling party from a data storage element.

19. The network element of claim 18, wherein the data storage element comprises a database associating telephone numbers with calling telephone stations.

20. The network element of claim 13, wherein the network element is further operative to connect a call between the calling party and the called party after transmitting the audible version of the information about the calling party to the called party.

21. A method for providing information about a calling party to a called party, the method comprising:
    obtaining caller identification information about the calling party when the called party's communication device is unavailable;
    notifying the called party that the calling party is attempting to contact the called party; and
    transmitting an audible version of the caller identification information to the called party without receiving an input from the called party.

* * * * *